US011832350B2

(12) United States Patent
Hu et al.

(10) Patent No.: US 11,832,350 B2
(45) Date of Patent: Nov. 28, 2023

(54) SYSTEM AND METHOD FOR PROVIDING EARLY INDICATION BY REDUCED CAPABILITY NR DEVICE (71) Applicant: Samsung Electronics Co., Ltd., Suwon-si (KR)

(72) Inventors: Liang Hu, San Diego, CA (US); Jung Hyun Bae, San Diego, CA (US); Mohammed Karmoose, San Diego, CA (US); Hsien-Ping Lin, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/226,054

(22) Filed: Apr. 8, 2021

(65) Prior Publication Data
US 2021/0352466 A1 Nov. 11, 2021

Related U.S. Application Data (60) Provisional application No. 63/021,466, filed on May 7, 2020.

(51) Int. Cl.
*H04W 8/24* (2009.01)
*H04W 74/08* (2009.01)
(Continued)

(52) U.S. Cl.
CPC ........... *H04W 8/24* (2013.01); *H04W 56/001* (2013.01); *H04W 72/0453* (2013.01); *H04W 72/23* (2023.01); *H04W 74/0833* (2013.01)

(58) Field of Classification Search
None
See application file for complete search history.

(56) References Cited

U.S. PATENT DOCUMENTS 10,785,080 B2    9/2020  Islam et al.
2019/0215906 A1  7/2019  Phuyal et al.
(Continued)

FOREIGN PATENT DOCUMENTS

EP      4106471 A1     * 12/2022
WO      WO-2022133357 A1 *  6/2022

OTHER PUBLICATIONS

Höglund, A. et al., "3GPP Release 15 Early Data Transmission", IEEE Communications Standards Magazine, Jun. 2018, pp. 90-96, IEEE.
(Continued)

*Primary Examiner* — Saba Tsegaye
(74) *Attorney, Agent, or Firm* — Lewis Roca Rothgerber Christie LLP (57) ABSTRACT

A system and method for providing early indication by a reduced capability New Radio (NR) User Equipment (UE). In some embodiments the reduced capability UE informs the network, by its use of a combination of preamble, Random Access Channel Occasion (RO), and initial bandwidth part (BWP), that it is a reduced capability UE. In some embodiments, the reduced capability UE transmits payload data in a Message A message. In some embodiments, the reduced capability UE receives, from the network, a set of candidate uplink resources, and transmits a Message 3 message within a subset of the set of candidate uplink resources.

15 Claims, 11 Drawing Sheets

(51) Int. Cl.
*H04W 72/04* (2023.01)
*H04W 56/00* (2009.01)
*H04W 72/0453* (2023.01)
*H04W 72/23* (2023.01)

(56) References Cited

U.S. PATENT DOCUMENTS

| | | | |
|---|---|---|---|
| 2019/0380156 A1 | 12/2019 | Akkarakaran et al. | |
| 2020/0120713 A1 | 4/2020 | Yerramalli et al. | |
| 2020/0252967 A1 | 8/2020 | Ozturk et al. | |
| 2020/0314913 A1 | 10/2020 | Rastegardoost et al. | |
| 2021/0176793 A1* | 6/2021 | Abedini | H04L 5/0048 |
| 2021/0195653 A1* | 6/2021 | Lei | H04W 72/0406 |
| 2021/0195654 A1* | 6/2021 | Lei | H04W 52/262 |
| 2022/0174745 A1* | 6/2022 | Lee | H04W 74/006 |

OTHER PUBLICATIONS

"Medium Access Control (MAC) protocol specification (Release 15)", 3$^{rd}$ Generation Partnership Project, Technical Specification Group Radio Access Network, Technical Specification 38.321 V15.8.0 (Dec. 2019), 2019, pp. 1-76, 3GPP Organizational Partners, URL: https://www.3gpp.org/ftp/Specs/archive/38_series/38.321.

"Work Item on NR smalldata transmissions in Inactive state", 3$^{rd}$ Generation Partnership Project, Technical Specification Group Radio Access Network Meeting #86, RP-193252, Dec. 9-12, 2019, 4 pages, URL: https://urldefense.com/v3/__https:/www.3gpp.org/ftp/TSG_RAN/TSG_RAN/TSGR_86/Docs/RP-193252.zip__;!!EwVzqGoTKBqv-0DWAJBm!Hjf-2gk4RD9p4yV2ohXmtnkRgKmNHFWiHYvgPSrUJkTOEMcjvkm1Su2PtdtKTiCtovHy$.

Ericsson: "PRACH Repetition for MTC," 3GPP, R1-150030, 3rd Generation Partnership Project (3GPP), Feb. 2015, 4 pages, Retrieved from the Internet: URL:https://www.3gpp.org/ftp/Meetings_3GPP_SYNC/RAN1/Docs/.

Ericsson: "Higher layer support for RedCap," 3GPP, R1-2100035, 3rd Generation Partnership Project (3GPP), Jan. 2021, 8 pages, Retrieved from the Internet: URL:https://ftp.3gpp.org/tsg_ran/WG1_RL1/TSGR1_104-e/Docs/R1-2100035.zip.

Huawei et al.: "Other aspects for reduced capability devices," 3GPP, R1-2004612, 3rd Generation Partnership Project (3GPP), May 2020, 6 pages, Retrieved from the Internet: URL:https://ftp.3gpp.org/tsg_ran/WG1_RL1/TSGR1_101-e/Docs/R1-2004612.zip.

OPPO: "Other considerations for reduced UE capability," 3GPP, R1-2008264, 3rd Generation Partnership Project (3GPP), Oct. 2020, 2 pages, Retrieved from the Internet: URL:https://ftp.3gpp.org/tsg_ran/WG1_RL1/TSGR1_103-e/Docs/R1-2008264.zip.

Qualcomm Incorporated: "Considerations for PDCCH Monitoring Reduction and Power Saving of RedCap Devices," 3GPP, R1-2004494, 3rd Generation Partnership Project (3GPP), May 2020, 7 pages, Retrieved from the Internet: URL:https://ftp.3gpp.org/tsg_ran/WG1_RL1/TSGR1_101-e/Docs/R1-2004494.zip.

Qualcomm Incorporated: "Complexity Reduction for RedCap Devices," 3GPP, R1-2101471, 3rd Generation Partnership Project (3GPP), Jan. 2021, 11 pages, Retrieved from the Internet: URL:https://ftp.3gpp.org/tsg_ran/WG1_RL1/TSGR1_104-e/Docs/R1-2101471.zip.

Xiaomi Communications: "Discussion on Identification and UE access restrictions for Redcap devices," 3GPP, R2-2008947, 3rd Generation Partnership Project (3GPP), Oct. 2020, 4 pages, Retrieved from the Internet: URL:https://ftp.3gpp.org/tsg_ran/WG2_RL2/TSGR2_112-e/Docs/R2-2008947.zip.

"Way Forward on PRACH enhancement for Rel-13 MTC,", 3GPP, R1-145373, 3rd Generation Partnership Project (3GPP), Nov. 2014, 3 pages, Retrieved from the Internet: URL:http://www.3gpp.org/ftp/tsg_ran/WG1_RL1/TSGR1_79/Docs/.

EPO Extended European Search Report dated Oct. 18, 2021, issued in corresponding European Patent Application No. 21169086.2 (14 pages).

* cited by examiner

| Step | Stage | DL BWP | UL BWP | Processing |
|---|---|---|---|---|
| 0 | PSS and SSS Decode | | | DL Synchronization |
| 1 | MIB decode | | | UE decode MIB and get CORESET #0 configuration |
| 2 | RMSI decode | CORESET #0 | | Get Initial DL-BWP and Initial UL-BWP setting for RMSI decoding |
| 3 | Msg-1-UE >——> gNB | | Initial UL-BWP | Random Access Request to gNB |
| 4 | Msg-2-UE <——< gNB | CORESET #0 | | Random Access Response (RAR) gNB |
| 5 | Msg-3-UE >——> gNB | | Initial UL-BWP | RRC connection request |
| 6 | Msg-4-UE <——< gNB | CORESET #0 | | RRC connection setup. Configure UE specific BWP (default/1st active/other) BWP. If not configured, still use initial BWP |
| 7 | Msg-5-UE >——> gNB | 1st Active BWP | 1st Active BWP | RRC set-up completed. Initial BWP is the 1st Active BWP if no additional configuration carried in Msg4 |

FIG. 3A

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

SYSTEM AND METHOD FOR PROVIDING EARLY INDICATION BY REDUCED CAPABILITY NR DEVICE

CROSS-REFERENCE TO RELATED APPLICATION(S)

The present application claims priority to and the benefit of U.S. Provisional Application No. 63/021,466, filed May 7, 2020, entitled "REDUCED CAPABILITY NR DEVICE EARLY INDICATION", the entire content of which is incorporated herein by reference.

FIELD

One or more aspects of embodiments according to the present disclosure relate to mobile communications, and more particularly to a system and method for accommodating reduced capability user equipment in a mobile communications network.

BACKGROUND

In mobile communications networks, useful applications may exist for user equipment that is small, or low-cost, or that consumes little power. Such user equipment may be more readily produced by reducing its capabilities compared to other user equipment. Unless accommodations are made for such reduced capabilities, however, the reduction in capabilities may in some circumstances result in a failure to establish a connection between the network and the user equipment.

Thus, there is a need for a system and method for accommodating reduced capability user equipment in a mobile network.

SUMMARY

According to an embodiment of the present disclosure, there is provided a method, including: receiving, by a reduced capability user equipment (UE), a synchronization signal block, transmitting, by the reduced capability UE, a Message 1 message, the Message 1 message including a preamble in a Random Access Channel Occasion (RO) in an uplink initial bandwidth part (BWP), the combination of the preamble, the RO, and the uplink initial bandwidth part indicating that the reduced capability UE is a reduced capability UE.

In some embodiments, the uplink initial bandwidth part indicates that the reduced capability UE is a reduced capability UE.

In some embodiments, the combination of the uplink initial bandwidth part and the preamble indicates that the reduced capability UE is a reduced capability UE.

In some embodiments, the preamble indicates that the reduced capability UE is a reduced capability UE.

In some embodiments, the preamble is a member of an extended preamble set, and the preamble is not a member of the legacy preamble set.

In some embodiments, the frequency location or the time location of the RO indicates that the reduced capability UE is a reduced capability UE.

In some embodiments, the RO is a member of an extended RO set, and the RO is not a member of the legacy RO set.

In some embodiments, the preamble is a member of an extended preamble set, and the preamble is not a member of the legacy preamble set.

In some embodiments, the frequency location of the RO indicates that the reduced capability UE is a reduced capability UE.

In some embodiments, the time location of the RO indicates that the reduced capability UE is a reduced capability UE.

In some embodiments: the combination of the preamble, the RO, and the uplink initial bandwidth part indicates that the reduced capability UE is a reduced capability UE with one receiver branch; or the combination of the preamble, the RO, and the uplink initial bandwidth part indicates that the reduced capability UE is a reduced capability UE with two receiver branches.

In some embodiments, the reduced capability UE supports fewer than 32 hybrid automatic repeat request (HARQ) processes.

In some embodiments, the reduced capability UE supports a proper subset of the full Physical Downlink Control Channel (PDCCH) search space.

In some embodiments, the reduced capability UE supports fewer than 28 Modulation and Coding Scheme (MCS) indices.

In some embodiments, the reduced capability UE supports time domain repetition for Physical Downlink Shared Channel (PDSCH) and Physical Downlink Control Channel (PDCCH) transmissions.

According to an embodiment of the present disclosure, there is provided a method, including: receiving, by a reduced capability user equipment (UE), a synchronization signal block; and transmitting, by the reduced capability UE, a Message A message, wherein the transmitting of the Message A message includes transmitting, by the reduced capability UE, payload data.

In some embodiments: the transmitting of the Message A message includes transmitting in a Physical Uplink Shared Channel (PUSCH) Occasion (PO), and the transmitting in the PO indicates that the reduced capability UE is a reduced capability UE.

According to an embodiment of the present disclosure, there is provided a method, including: receiving, by a reduced capability user equipment (UE), a synchronization signal block; transmitting, by the reduced capability UE, a Message 1 message; receiving, by the reduced capability UE, a Message 2 message; and transmitting, by the reduced capability UE, a Message 3 message, wherein: the Message 2 message includes a set of candidate uplink resources, and the transmitting of the Message 3 message includes transmitting the Message 3 message within a subset of the set of candidate uplink resources.

In some embodiments, the transmitting of the Message 3 message includes transmitting, by the reduced capability UE, an indication that the reduced capability UE is a reduced capability UE.

In some embodiments: the receiving of the synchronization signal block includes receiving a System Information Block #1 (SIB1), the SIB1 specifying a maximum transport block size for Message 3; the transmitting of the Message 3 message includes transmitting payload data; and the payload data has a size less than or equal to the maximum transport block size.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for providing early indication by a reduced capability New Radio (NR) device provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In the 3rd Generation Partnership Project (3GPP) Release 17 (Rel-17) of the standard for the 5th generation mobile network (5G), in a Study Item (SID) on Reduced Capability New Radio (NR) devices, one of the objectives is to identify and study potential UE complexity reduction features such as User Equipment (UE) bandwidth reduction. With the introduction of reduced capability UEs, it may be advantageous to provide a mechanism for such reduced capability NR UEs to give the network an early indication (that the UE is a reduced capability UE), and early data transmission.

As used herein, "legacy" refers to a full capability UE, or a system lacking special provisions for accommodating reduced capability UEs, or to an element of such a system (e.g., a legacy CORESET #0 or a legacy Physical Broadcast Channel (PBCH)). As used herein, certain phrases, such as "user equipment" and "downlink control information" are used as countable nouns even though the nouns they contain (e.g., "equipment" and "information") may not be countable in ordinary English. As used herein, a "reduced capability UE" is a UE having capabilities that are in some way inferior to those of a legacy UE; a legacy UE is a UE meeting the requirements of 3GPP Release 15 and Release 16.

Figure 1:
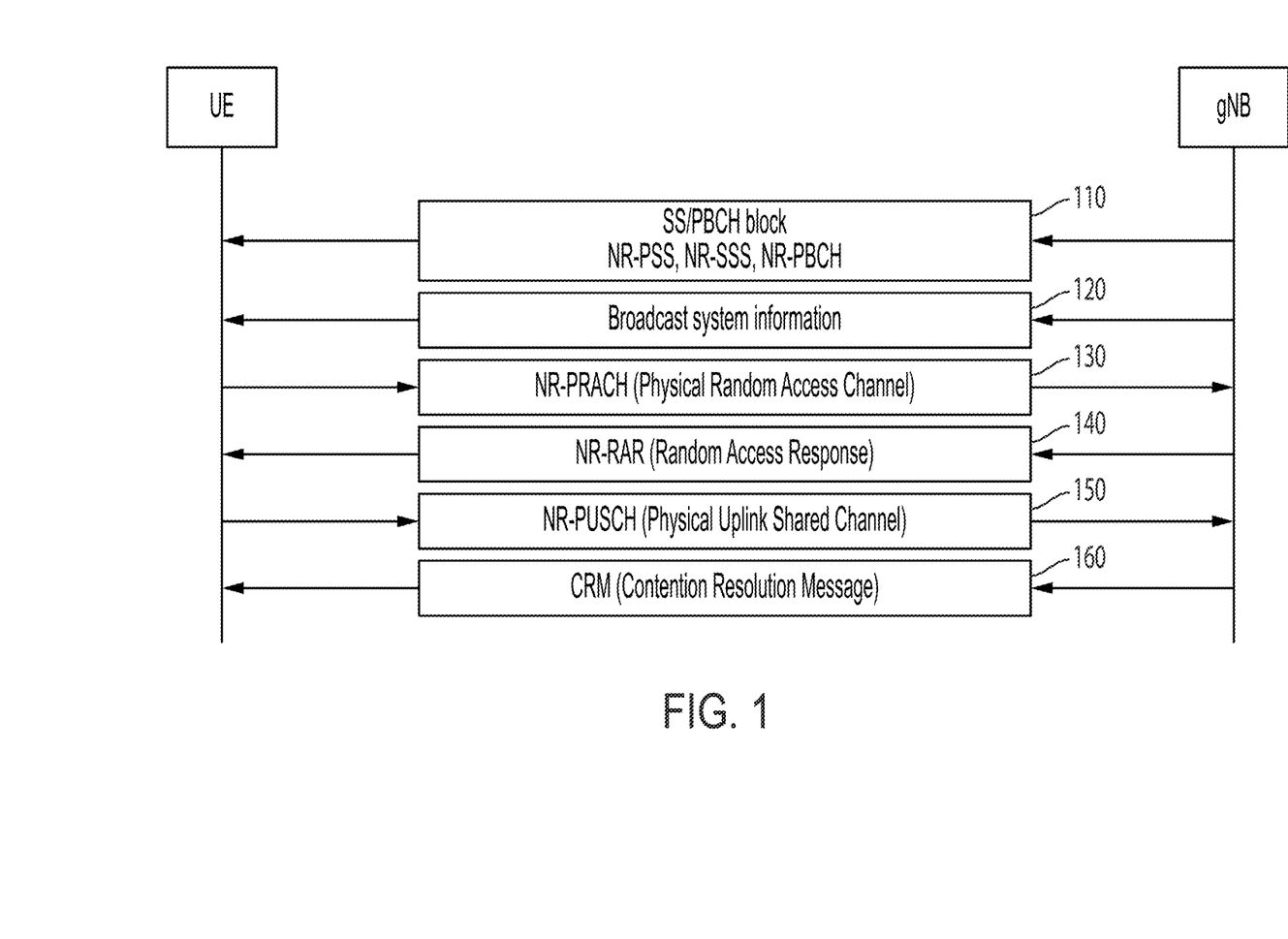
FIG. 1 is an illustration of an initial access procedure, according to an embodiment of the present disclosure.

The legacy initial access procedure in NR is illustrated in FIG. 1. As shown in FIG. 1, it may include (e.g., consist of) the following steps: at 110, the network base station (gNB) periodically transmits Synchronization Signal (SS) blocks (SSBs) carrying synchronization signals (including primary synchronization signals PSSs, and secondary synchronization signals (SSSs)) and Physical Broadcast Channels (PBCHs) using beam sweeping. One SS block contains one PSS symbol, one SSS symbol, and two PBCH symbols. A Synchronization Signal burst may carry one or multiple SS blocks. The combination of PSS and SSS may help to identify about 1008 physical cell identities. Each UE performs beam measurements and determines the best beam during synchronization.

Subsequently, at 120, the gNB transmits, and the UE receives and decodes, 5G New Radio (NR) system information viz. a Master Information Block (MIB) and a System Information Block (SIB) on that beam. Minimum SI (System Information) is carried on the Physical Broadcast Channel. The rest of the Remaining Minimum System Information (RMSI) and the SIB1 is carried on the Physical Downlink Shared Channel (PDSCH). The numerology used for the RMSI is indicated in the PBCH payload. CORESET #0 is dedicated for RMSI scheduling. CORESET #0 is not confined within PBCH Bandwidth. There is an RMSI Physical Downlink Control Channel (PDCCH) monitoring window associated with the SS/PBCH block, which recurs periodically. Other System Information (OSI) contains on-demand system information delivery. OSI is carried on the PDSCH using the same numerology as is used for the RMSI. At 130, the UE uses the same beam and attempts random access by transmitting a Random Access Channel (RACH) preamble (i.e., Message 1, or "Message #1") on the configured RACH resource. The gNB responds with a Random Access Response RAR ("RA Response") message, which is Message 2, or "Message #2". The UE then transmits, at 150, Message 3, or "Message #3" (i.e., a Radio Resource Control (RRC) Connection Request) in the Physical Uplink Shared Channel (PUSCH) (e.g., NR-PUSCH). The gNB then responds, at 160, with Message 4, or "Message #4" (i.e., RRC Connection Setup) which is the contention resolution message and which completes the initial access process.

Figure 2:
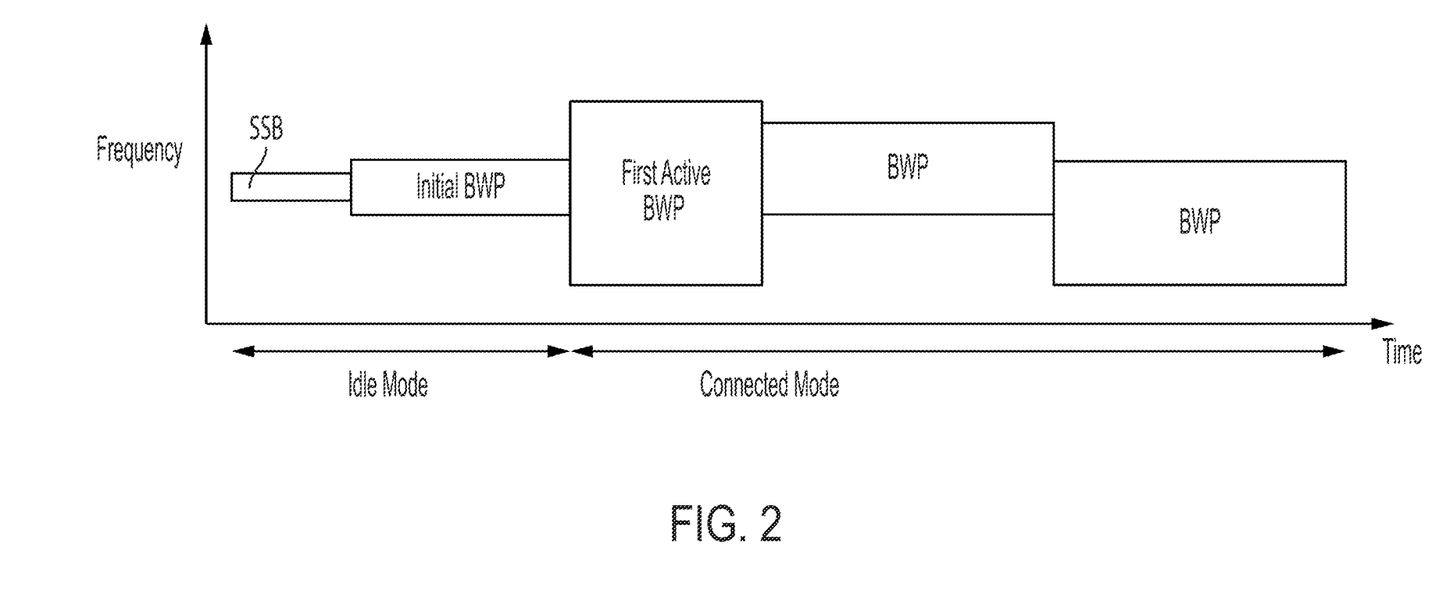
FIG. 2 is an illustration of a sequence of bandwidth parts, according to an embodiment of the present disclosure.

FIG. 2 shows the different BWP types available for a UE in different RRC states. In some use cases, the Idle Mode BWP may be smaller than Connected Mode BWPs. Three types of BWP are available: Initial BWP, Active BWP (UE Specific), and Default BWP (UE Specific). The Initial BWP is used to perform the Initial Access procedure. It includes Parameters like RMSI (Requested Minimum System Information), CORESET #0 and RMSI frequency location, bandwidth, and SCS. It can be between 24 and 96 PRBs with different settings and it may be relaxed to a wider BWP after RMSI decoding. The Active BWP is defined as UE specific. It is the first BWP within which the UE starts data transfer after RRC configuration or reconfiguration. The very first Active BWP may be different from the default BWP.

Figure 3A:
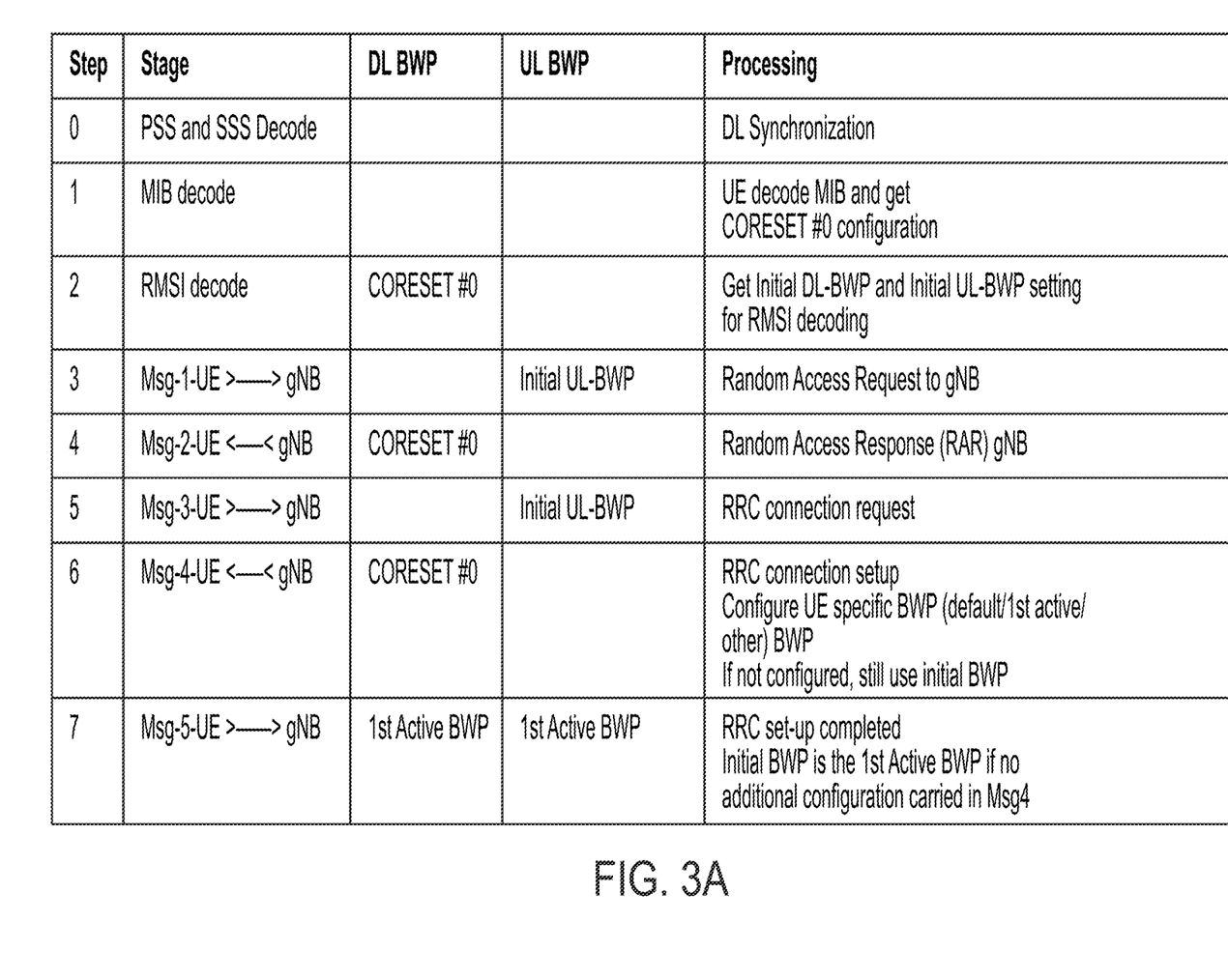
FIG. 3A is a table of bandwidth part configurations, according to an embodiment of the present disclosure.

The table of FIG. 3A shows the BWP configurations at different stages of the initial access process; both uplink and downlink BWPs are considered. The BWP configuration is split into uplink and downlink parameters as well as into common and dedicated parameters. Common parameters (in BWP-UplinkCommon and BWP-DownlinkCommon) may be "cell specific" and the network may ensure the necessary alignment with corresponding parameters of other UEs. The common parameters of the initial BWP of the PCell are also provided via system information. For all other serving cells, the network may provide the common parameters via dedicated signaling.

Figure 3B:
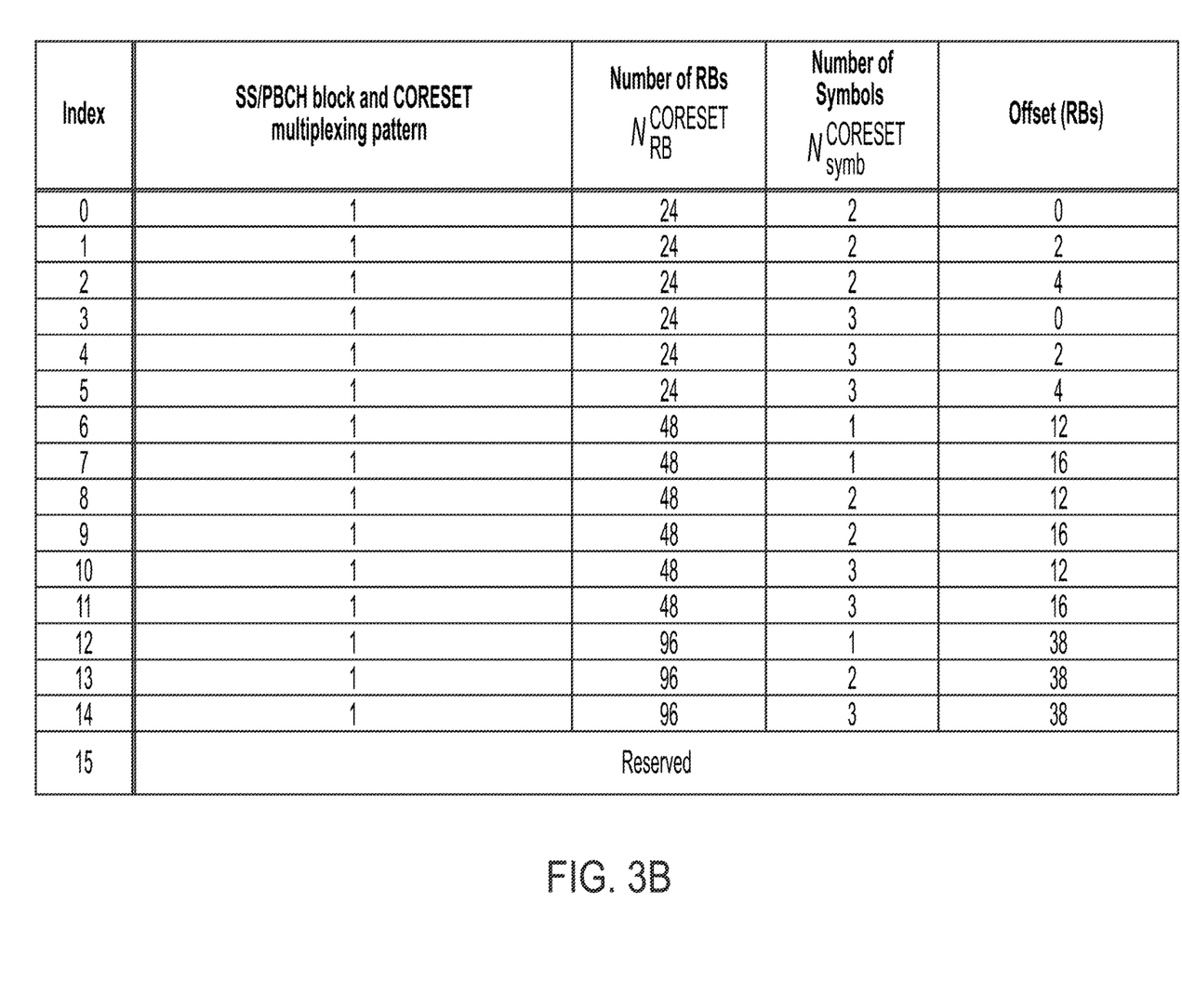
FIG. 3B is a table of resource blocks and slot symbols, according to an embodiment of the present disclosure.

The CORESET #0 configurations are pre-defined in a set of tables, and the index of the table to be used is contained in the MIB message. The table of FIG. 3B shows one example of a set of resource blocks and slot symbols of a CORESET #0 configuration when [SS/PBCH block, PDCCH] SCS is [15,15] kHz (i.e., the SCS of SS/PBCH block and PDCCH are 15 kHz and 15 kHz respectively) for frequency bands with minimum channel bandwidth 5 and 10 MHz. The initial CORESET may be the one for SIB1/PDCCHType0.

Figure 4:
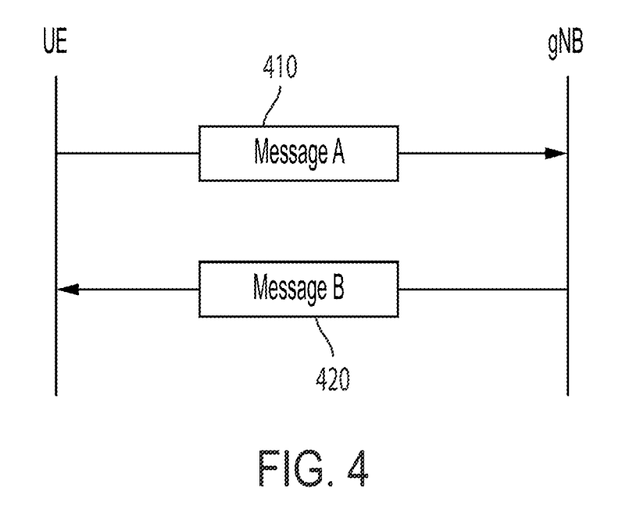
FIG. 4 is a message flow diagram for a two-step Random Access Channel (RACH) process, according to an embodiment of the present disclosure.

In some embodiments, a two-step RACH process may be employed, instead of the four-step RACH process described above in the context of FIG. 1, after the UE has received the SSB, the MIB and the SIB1. The two-step RACH process is illustrated in FIG. 4. At 410, the UE sends, to the network, a message referred to as "Message A", and at 420, the network sends, to the UE, a message referred to as "Message B". Message A may include a Physical Random Access Channel (PRACH) preamble and a PUSCH transmission. The set of Message A preambles may be distinct from the four-step RACH preambles, and may be transmitted in the same RACH Occasions (ROs) as the preambles of four-step RACH, or in separate ROs. The PUSCH transmissions may be organized into PUSCH Occasions (POs) which may span multiple symbols and PRBs.

UEs with infrequent (periodic or non-periodic) data transmission may generally be maintained in the RRC_INACTIVE state by the network. Until Rel-16, the RRC_INACTIVE state has not supported payload data transmission (i.e., transmission, by the UE, of payload data), and, in such a network, the UE may need to resume the connection (i.e., transition to the RRC_CONNECTED state) for any downlink (mobile terminated) and uplink (mobile originating) payload data. The connection setup and subsequent release to the INACTIVE state may occur for each data transmission, however small or infrequent the data packets are. This may result in unnecessary power consumption and signaling overhead. In general, any UE that transmits intermittent small data packets in the INACTIVE state may benefit from enabling small data transmission (i.e., transmission of payload data) in INACTIVE (i.e., the UE may benefit from performing a transmission of payload data without transitioning out of the inactive state). As used herein, "payload data" is data transmitted to the network for forwarding out of the network, to another network user.

Figure 5:
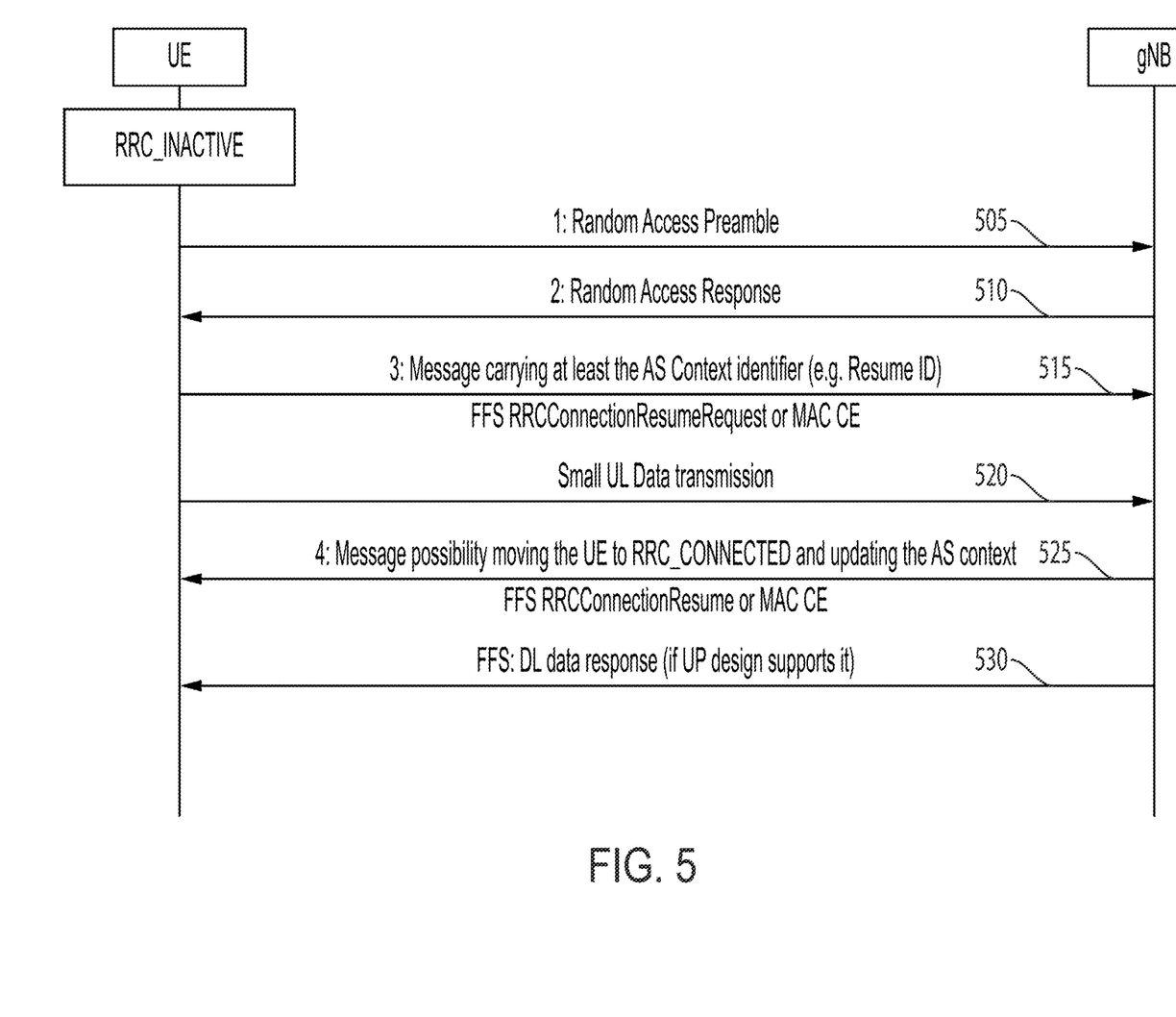
FIG. 5 is a message flow diagram for an uplink transmission of payload data in an inactive state, according to an embodiment of the present disclosure.

For the sake of simplicity, 4-step RACH is assumed in the example of FIG. 5. A high level signaling flow may proceed as follows. At 505, a UE in the RRC_INACTIVE state sends a PRACH preamble. At 510, the network responds with a Random Access Response (RAR). The UE sends, at 515, a Message 3 which contains at least an Access Stratum (AS) context identifier (e.g., resumeID) to be used for contention resolution, and, at 520, a small uplink data packet containing payload data. This message may contain all necessary information to enable the network to move the UE to RRC_CONNECTED or to enable the network to let the UE remain in RRC_INACTIVE. It may also provide information to enable the network to apply overload control and prioritization, if needed. Triggered by Message 3, the network may then be able to move to RRC_CONNECTED via a downlink RRC Message 4 (e.g. RRCConnectionResume). The network should be also able to update the AS context with Message 4.

In such a process, it may be advantageous for the reduced capability UE to give the network an early indication of the reduced capability NR UE in the random access procedure, i.e., to give the network an early indication that the reduced capability UE is a reduced capability UE. In some embodiments, the accommodating of reduced capability UEs in the initial access process may be accomplished by various methods, identified herein as Embodiment 1 and Embodiment 2, with several options (referred to herein as Option 1 through Option 5) possible for Embodiment 1. These embodiments are explained herein, for ease of explanation, in the context of a legacy UE and a reduced capability UE, both of which are performing the initial access process. In operation, many legacy UEs and many reduced capability UEs may be interacting with the gNB at any time. In Embodiment 1 and in Embodiment 2, the network may send certain information to the reduced capability UE, in a SIB1 message. This SIB1 message may be either (i) a legacy SIB1 message, with reserved bits used to implement any new signaling not ordinarily performed by a legacy SIB1 message, or (ii) a new SIB1 message (transmitted in addition to a legacy SIB1 message) dedicated to reduced capability UEs. As used herein, when a "SIB1 message" is mentioned without further qualification (e.g., without specifying that it is a legacy SIB1 message or that it is a new SIB1 message), the SIB1 message may be either a legacy SIB1 message or a new SIB1 message.

Figure 6A:
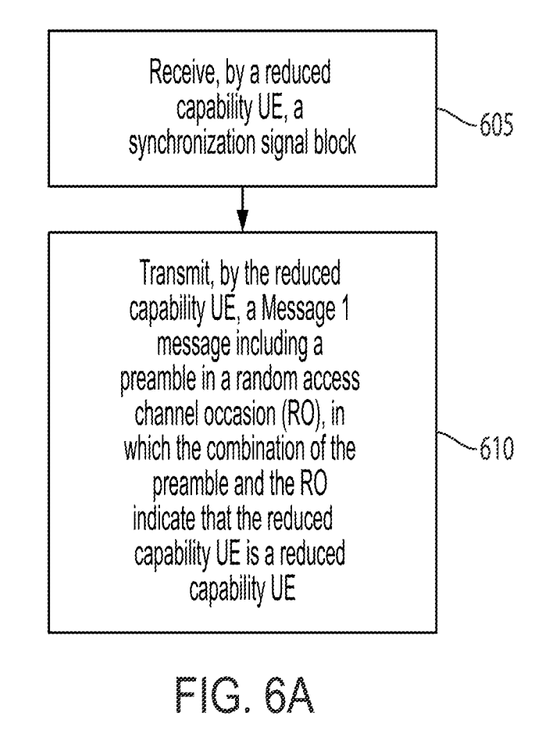
FIG. 6A is a flow chart of a portion of a method for an uplink transmission of payload data in an inactive state, according to an embodiment of the present disclosure.

In one embodiment, referred to herein as Embodiment 1, early capability indication is performed in Message 1, in the case of four-step RACH, or in Message A, in the case of two-step RACH. In Option 1, preamble partitioning or RO (Random Access Occasion) partitioning may be employed, in which some specific combinations of preamble and RO are reserved for use by the reduced capability UE. As shown in FIG. 6A, the reduced capability UE may receive, at 605, an SSB. The specific partitioning may be indicated in a SIB1 message. For each RO, there may be 64 preambles. The reduced capability UE may first pick a RO (from a set of ROs) corresponding to the SSB index with highest measured reference signal received power (RSRP); next, the reduced capability UE may select a preamble. As such, the indication, by the UE, of reduced capability may be done by the reduced capability UE transmitting, at 610, in a specific RO (i.e., in an RO reserved for reduced capability UEs), or by the reduced capability UE transmitting a specific preamble (i.e., a preamble reserved for reduced capability UEs), or by the reduced capability UE transmitting a preamble in an RO, where the combination of the preamble and the RO is a combination that is reserved for reduced capability UEs.

The gNB and the reduced capability UE category may be preconfigured to be mapped to (e.g., to have) one or more characteristics selected from a group of characteristics including the following characteristics, numbered 1) through 6). 1) The gNB may allocate enough uplink resource elements for a Message 3 transmission that includes inactive mode payload data transmission from reduced capability UE. 2) The reduced capability UE may have reduced processing capability (compared to a legacy UE) and may (i) support fewer hybrid automatic repeat request (HARQ) processes than a legacy UE, and (ii) require longer HARQ acknowledgment (ACK) timing in each downlink control information (DCI) than a legacy UE. As such, the gNB may configure a specific HARQ configuration for the reduced capability UE, e.g., a smaller number of HARQ processes, with longer HARQ ACK timing in each DCI. 3) The gNB may configure and perform beam refinement for the reduced capability UE in the random access phase in the case of FR2. 4) The reduced capability UE may support a reduced PDCCH search space, i.e., the search space the reduced capability UE supports may be a proper subset of the full PDCCH search space (i.e., a proper subset of the search space supported by a legacy UE). For example, in Rel-15 and Rel-16 NR, the number of blind decodings (BDs) per slot may be configurable up to the limits defined for different SCS configurations. In particular, for subcarrier spacings of 15, 30, 60 and 120 kHz, the blind decoding limits may be 44, 36, 22, and 20, respectively. The reduced capability UE may support a reduced maximum number of BDs in a slot, e.g., to reduce power consumption in the reduced capability UE. In Rel-15 and Rel-16 specifications, the total number of different DCI sizes that a legacy UE is configured to monitor is up to 4, with up to 3 different DCI sizes with C-RNTI. As such, the reduced capability UE may support (i) a reduced maximum number of BDs per slot without a reduced DCI size budget, or (ii) a reduced DCI size budget. The reduced capability UE may only support a reduced PDCCH search space, e.g., it may support a smaller number of monitored PDCCH candidates per slot than the blind decoding limits listed above. 5) The reduced capability UE may support a lower maximum Modulation and Coding Scheme (MCS) (e.g., it may support fewer than the 28 Modulation and Coding Scheme (MCS) indices supported by a legacy UE). 6) The reduced capability UE may enable time domain repetition for PDSCH and PDCCH transmission. The use of Option 1 may result in a higher probability of contention and in fewer Random Access Channel Occasions (ROs), but it may have the advantage that the network knows at the earliest time that the reduced capability UE is a reduced capability UE.

Figure 6B:
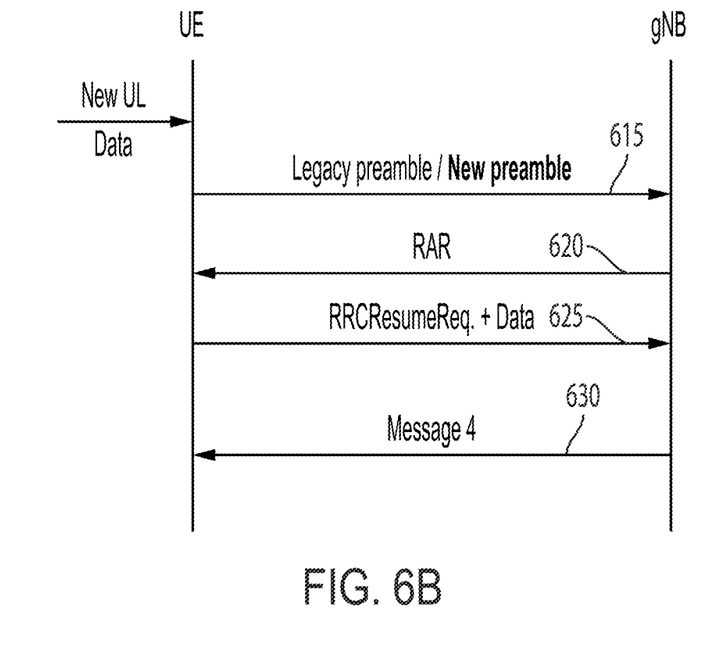
FIG. 6B is a message flow diagram of a portion of a method for an uplink transmission of payload data in an inactive state, according to an embodiment of the present disclosure.

In Option 2, the set of available preambles is extended, i.e., new preambles are defined, and reserved for use by reduced capability UEs. The existence of such new preambles may be indicated by the network in a SIB1 message. FIG. 6B is a message flow diagram of a portion of the method of Option 2. In response to being notified by the network that certain new preambles are available for use by reduced capability UE, the reduced capability UE may transmit, at 615, one of the new preambles, thereby notifying the network that the reduced capability UE is a reduced capability UE. In other respects, the system may operate in the same manner, or in an analogous manner, as in Option 1. The network may transmit a (Message 2) RAR at 620, the reduced capability UE may transmit, at 625, a Message 3 message including payload data, and the network may then respond, at 630, with a Message 4 message.

In Option 3, the set of available ROs is extended, i.e., new ROs are defined, and reserved for use by reduced capability UEs. The existence of such new ROs may be indicated by the network in a SIB1 message. In response to being notified by the network that certain new ROs are available for use by the reduced capability UE, the reduced capability UE may transmit the preamble in one of the new ROs, thereby notifying the network that the reduced capability UE is a reduced capability UE. In other respects, the system may operate in the same manner, or in an analogous manner, as in Option 1.

In Option 4, the set of available preambles and the set of available ROs are both extended, i.e., new preambles and new ROs are defined, and reserved for use by reduced capability UEs. The existence of such new preambles and new ROs may be indicated by the network in a SIB1 message. In response to being notified by the network that certain new preambles and new ROs are available for use by reduced capability UEs, the reduced capability UE may transmit (i) a legacy preamble in one of the new ROs, or (ii) a new preamble in one of the legacy ROs, or (iii) a new preamble in one of the new ROs, thereby notifying the network that the reduced capability UE is a reduced capability UE. In other respects, the system may operate in the same manner, or in an analogous manner, as in Option 1.

Figure 7:
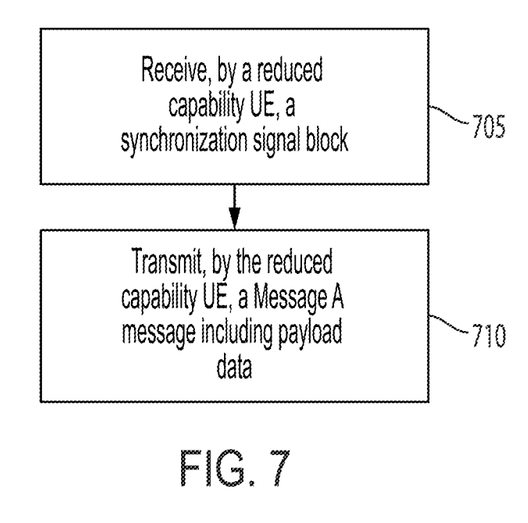
FIG. 7 is a flow chart of a portion of a method for an uplink transmission of payload data in an inactive state, according to an embodiment of the present disclosure.

In Option 5, in the case of two-step RACH, the indication that the reduced capability UE is a reduced capability UE may be carried in a PUSCH transmission in message A, as illustrated in FIG. 7. In particular, the PUSCH occasions (POs) may be partitioned or extended for UEs to indicate reduced capability, e.g., certain POs (each of which may be either a new PO or a legacy PO) may be reserved for use by reduced capability UEs, so that by transmitting in one of these POs, the reduced capability UE may indicate to the network that it is a reduced capability UE. Which partitioned or extended POs are reserved for use by reduced capability UEs may be indicated in a SIB1 message. As shown in FIG. 7, the reduced capability UE may receive, at 705, a synchronization signal block, and it may, at 710, transmit a Message A message including payload data.

In each of Options 1-5, the network may also include, in a SIB1 message, the following parameters, for Message 3 transmission: (i) the maximum transport size, or (ii) the maximum MCS, or (iii) the maximum size of the resource blocks.

The combinations of RO frequency location, RO time location, and preamble may form a three-dimensional space, in which each such combination may be either reserved for reduced capability UEs or available to legacy UEs. As such, it may be the case that (i) one RO is entirely reserved for reduced capability UEs (in the sense that any preamble transmitted in that RO indicates that the transmitting UE is a reduced capability UE), (ii) one preamble is entirely reserved for reduced capability UEs (in the sense that this preamble, transmitted in any RO, indicates that the transmitting UE is a reduced capability UE), (iii) a RO and preamble combination is reserved for reduced capability UEs without the RO or the preamble being entirely reserved for reduced capability UEs (e.g., the same preamble, transmitted in another RO, may not indicate that the transmitting UE is a reduced capability UE, and a different preamble, transmitted in the same RO, may not indicate that the transmitting UE is a reduced capability UE). Similarly, it may be that a combination of a RO frequency location and RO time location is reserved for reduced capability UEs without the RO frequency location or the RO time location being entirely reserved for reduced capability UEs (e.g., a preamble transmitted in the same RO frequency location and at another RO time location may not indicate that the transmitting UE is a reduced capability UE, and a preamble transmitted in another RO frequency location and at the same RO time location may not indicate that the transmitting UE is a reduced capability UE).

In some embodiments, there may be multiple types (e.g., four types) of reduced capability UE, each of the types having different capabilities (e.g., each of the four types having a different bandwidth capability, or a first group of two types having a first bandwidth capability and a second group of two types having a second bandwidth capability, and within each group, one type having a first MCS capability and the second type having a second MCS capability). In such a case, each RO and preamble combination may be either (i) available to legacy UEs, or (ii) reserved to only one of the types of reduced capability UE, so that the use of a reserved RO and preamble combination will indicate to the network (i) that the UE is a reduced capability UE and (ii) which type of reduced capability UE the UE is. In some embodiments a first type (or group of types) of reduced capability UE may be one with one receiver branch (Rx branch) and a second type (or group of types) of reduced capability UE may be one with two receiver branches.

In some embodiments the initial bandwidth part (BWP) within which the UE transmits (i.e., the uplink initial bandwidth part) may also be used for capability indication. For example, the combinations of (i) the preamble transmitted by the UE, (ii) the frequency location of the RO within which the UE transmits, (iii) the time location of the RO within which the UE transmits, and (iv) the initial BWP within which the UE transmits may form a four-dimensional space in which each such combination may be either reserved for reduced capability UEs, or available to legacy UEs. If there are multiple types of reduced capability UE, each of the combinations reserved for reduced capability UEs may be reserved for a particular type of reduced capability UE, and, as such, the combination (within the four-dimensional space) used by the UE may be an indication to the network (i) that the reduced capability UE is a reduced capability UE and (ii) which type of reduced capability UE the reduced capability UE is. For example, one or several different uplink initial BWPs may be used in Message 1 to give the network an early indication that the reduced capability UE is a reduced capability UE.

Figure 8A:
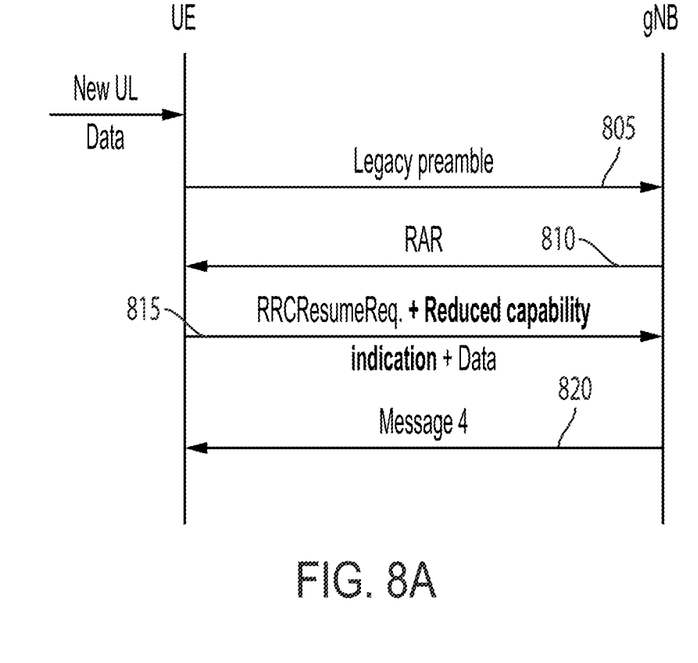
FIG. 8A is a message flow diagram of a portion of a method for an uplink transmission of payload data in an inactive state, according to an embodiment of the present disclosure.

In a second embodiment, which may be referred to as Embodiment 2, an early capability indication may be communicated by the reduced capability UE to the network in Message 3, as shown in FIG. 8A. In this embodiment, the reduced capability UE may, at 805, send a legacy preamble, and, at 810, the network may, without knowing the capability of the UE (e.g., without knowing whether the UE is a legacy UE or a reduced capability UE), grant a set of candidate UL resources, in Message 2, to the UE, taking into account that the UE may be a reduced capability UE. For example, at least a part of the granted resources may be within the uplink initial BWP of the reduced capability UE, and the granted resources may be sufficient to support the maximum transport block size of Message 3 transmission of payload data by a reduced capability UE. The network may include, in a SIB1 message, the following parameters, for Message 3 transmission of payload data: (i) the maximum transport size, or (ii) the maximum MCS, or (iii) the maximum size of the resource blocks.

Figure 8B:
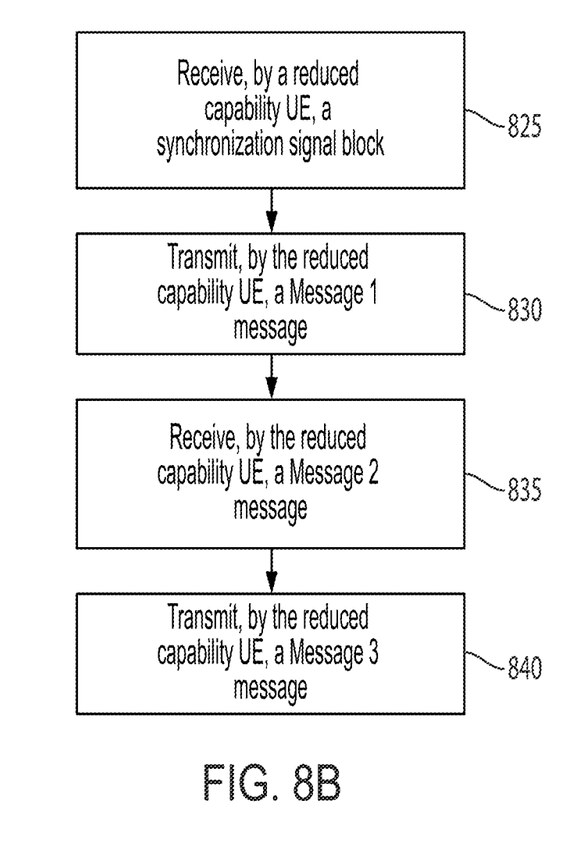
FIG. 8B is a flow chart of a portion of a method for an uplink transmission of payload data in an inactive state, according to an embodiment of the present disclosure.

In Message 3, the reduced capability UE may, at 815, transmit by using the part of the granted resource within its uplink initial BWP. The gNB may then blindly decode the set of granted resources and obtain the Message 3 from the reduced capability UE. In Message 3, the reduced capability UE may also indicate (e.g., using one or more reserved bits of the Message 3 message) that the reduced capability UE is a reduced capability UE (and, if more than one type of reduced capability UE is supported, which type it is). In some embodiments the size of the Message 3 message may be extended to carry one or more additional bits, which may then be used to indicate to the network that the reduced capability UE is a reduced capability UE (and, if more than one type of reduced capability UE is supported, which type it is). The network, may then, at 820, respond with a Message 4 message. FIG. 8B is a flow chart of Embodiment 2. As mentioned above, the method may include receiving, at 825, by a reduced capability user equipment (UE), a synchronization signal block; transmitting, at 830, by the reduced capability UE, a Message 1 message; receiving, at 835, by the reduced capability UE, a Message 2 message; and transmitting, at 840, by the reduced capability UE, a Message 3 message.

In some embodiments, methods described herein may be performed by a processing circuit of the UE, or by a processing circuit of the network or both. For example, the processing circuit of the UE may send (via a radio in the UE), to a network, Message 1 and Message 3 of the initial access process. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second number is "within Y %" of a first number, it means that the second number is at least $(1-Y/100)$ times the first number and the second number is at most $(1+Y/100)$ times the first number. As used herein, the term "or" should be interpreted as "and/or", such that, for example, "A or B" means any one of "A" or "B" or "A and B".

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for providing early indication by a reduced capability NR device have been specifically described and illustrated herein, many modifications and variations will be apparent to those skilled in the art. Accordingly, it is to be understood that a system and method for providing early indication by a reduced capability NR device constructed according to principles of this disclosure may be embodied other than as specifically described herein. The invention is also defined in the following claims, and equivalents thereof.

What is claimed is:

1. A method, comprising:
  receiving, by a reduced capability user equipment (UE), a synchronization signal block,
  transmitting, by the reduced capability UE, a Message 1 message,
  the Message 1 message comprising a preamble in a Random Access Channel Occasion (RO) in an uplink initial bandwidth part (BWP),
  the combination of the preamble, the RO, and the uplink initial bandwidth part indicating that the reduced capability UE is a reduced capability UE.

2. The method of claim 1, wherein the uplink initial bandwidth part indicates that the reduced capability UE is a reduced capability UE.

3. The method of claim 1, wherein the combination of the uplink initial bandwidth part and the preamble indicates that the reduced capability UE is a reduced capability UE.

4. The method of claim 1, wherein the preamble indicates that the reduced capability UE is a reduced capability UE.

5. The method of claim 4, wherein the preamble is a member of an extended preamble set, and the preamble is not a member of the legacy preamble set.

6. The method of claim 1, wherein the frequency location or the time location of the RO indicates that the reduced capability UE is a reduced capability UE.

7. The method of claim 6, wherein the RO is a member of an extended RO set, and the RO is not a member of the legacy RO set.

8. The method of claim 7, wherein the preamble is a member of an extended preamble set, and the preamble is not a member of the legacy preamble set.

9. The method of claim 6, wherein the frequency location of the RO indicates that the reduced capability UE is a reduced capability UE.

10. The method of claim 6, wherein the time location of the RO indicates that the reduced capability UE is a reduced capability UE.

11. The method of claim 1, wherein:
  the combination of the preamble, the RO, and the uplink initial bandwidth part indicates that the reduced capability UE is a reduced capability UE with one receiver branch; or
  the combination of the preamble, the RO, and the uplink initial bandwidth part indicates that the reduced capability UE is a reduced capability UE with two receiver branches.

12. The method of claim 1, wherein the reduced capability UE supports fewer than 32 hybrid automatic repeat request (HARQ) processes.

13. The method of claim 1, wherein the reduced capability UE supports a proper subset of the full Physical Downlink Control Channel (PDCCH) search space.

14. The method of claim 1, wherein the reduced capability UE supports fewer than 28 Modulation and Coding Scheme (MCS) indices.

15. The method of claim 1, wherein the reduced capability UE supports time domain repetition for Physical Downlink Shared Channel (PDSCH) and Physical Downlink Control Channel (PDCCH) transmissions.

* * * * *